US011290215B2

United States Patent
Tirronen et al.

(10) Patent No.: US 11,290,215 B2
(45) Date of Patent: Mar. 29, 2022

(54) UPLINK HARQ PROCEDURE FOR MTC OPERATION

(71) Applicant: Telefonaktiebolaget LM Ericsson (publ), Stockholm (SE)

(72) Inventors: Tuomas Tirronen, Helsinki (FI); Yufei Blankenship, Kildeer, IL (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1088 days.

(21) Appl. No.: 15/300,584

(22) PCT Filed: Aug. 5, 2016

(86) PCT No.: PCT/SE2016/050740
§ 371 (c)(1),
(2) Date: Sep. 29, 2016

(87) PCT Pub. No.: WO2017/023200
PCT Pub. Date: Feb. 9, 2017

(65) Prior Publication Data
US 2017/0187494 A1 Jun. 29, 2017

Related U.S. Application Data

(60) Provisional application No. 62/201,913, filed on Aug. 6, 2015.

(51) Int. Cl.
*H04L 1/16* (2006.01)
*H04L 1/18* (2006.01)
(Continued)

(52) U.S. Cl.
CPC .......... *H04L 1/1671* (2013.01); *H04L 1/0026* (2013.01); *H04L 1/189* (2013.01);
(Continued)

(58) Field of Classification Search
CPC ... H04L 1/1671; H04L 5/0055; H04L 1/1825; H04L 1/0026; H04L 1/1896; H04L 1/189;
(Continued)

(56) References Cited

U.S. PATENT DOCUMENTS

| 8,687,607 B2 | 4/2014 | Casaccia et al. |
| 2011/0237283 A1* | 9/2011 | Shan .................... H04L 5/0091 455/509 |

(Continued)

FOREIGN PATENT DOCUMENTS

| EP | 2869489 A1 | 5/2015 |
| EP | 2903195 A1 | 8/2015 |

(Continued)

OTHER PUBLICATIONS

Intel Corporation; "Common control message enhancement for MTC;" 3GPP TSG RAN WG1 Meeting #9; Nov. 17-21, 79, 2014; San Francisco, CA, USA; pp. 1-8; R1-145215.
(Continued)

*Primary Examiner* — Oussama Roudani
(74) *Attorney, Agent, or Firm* — Coats & Bennett, PLLC

(57) ABSTRACT

The solution presented herein introduces variable repetition levels for control and data transmissions via a physical downlink control channel for machine-type communications, e.g., the M-PDDCH. When a wireless terminal detects and correctly decodes a message carried by physical downlink control channel for machine-type communications that requests retransmissions, the wireless terminal performs adaptive uplink retransmissions according to a retransmission format defined by the message. The retransmission format defines at least one of a modulation and coding rate for the retransmissions, a frequency resource for the retransmissions, and a number of repetitions.

26 Claims, 15 Drawing Sheets

(51) Int. Cl.
*H04L 1/00* (2006.01)
*H04L 5/00* (2006.01)
*H04W 72/04* (2009.01)
*H04W 72/12* (2009.01)

(52) U.S. Cl.
CPC .......... *H04L 1/1822* (2013.01); *H04L 1/1825* (2013.01); *H04L 1/1887* (2013.01); *H04L 1/1896* (2013.01); *H04L 5/0055* (2013.01); *H04W 72/0413* (2013.01); *H04W 72/1268* (2013.01)

(58) Field of Classification Search
CPC ............... H04L 1/1887; H04L 1/1822; H04W 72/1268; H04W 72/0413
See application file for complete search history.

(56) References Cited

U.S. PATENT DOCUMENTS

| | | | | |
|---|---|---|---|---|
| 2013/0250772 | A1* | 9/2013 | Yin | H04L 1/1822 370/241 |
| 2014/0105191 | A1* | 4/2014 | Yang | H04L 1/1867 370/336 |
| 2014/0362832 | A1* | 12/2014 | Rudolf | H04L 1/1822 370/336 |
| 2015/0098418 | A1 | 4/2015 | Vajapeyam et al. | |
| 2015/0181533 | A1 | 6/2015 | Chen et al. | |
| 2016/0211949 | A1* | 7/2016 | You | H04W 4/70 |
| 2016/0381680 | A1 | 12/2016 | Yasukawa et al. | |
| 2017/0093480 | A1* | 3/2017 | Ijaz | H04B 7/15507 |
| 2017/0346607 | A1* | 11/2017 | Chen | H04W 72/1284 |
| 2018/0097586 | A1* | 4/2018 | Kim | H04L 1/1887 |

FOREIGN PATENT DOCUMENTS

| | | | |
|---|---|---|---|
| EP | 3062457 | A1 | 8/2016 |
| JP | 2012120182 | A | 6/2012 |
| JP | 2015513848 | A | 5/2015 |
| RU | 2349055 | C2 | 3/2009 |
| WO | 20130127634 | A1 | 9/2013 |
| WO | 2014067488 | A1 | 5/2014 |
| WO | 2014111043 | A1 | 7/2014 |
| WO | 2015021318 | A2 | 2/2015 |
| WO | 2015065947 | A1 | 5/2015 |

OTHER PUBLICATIONS

Ericsson, "Random access for Rel-13 low complexity and coverage enhanced UEs", 3GPP TSG-RAN WG2 #90, Fukuoka, Japan, May 25, 2015, pp. 1-9, Tdoc R2-152649, 3GPP.

3rd Generation Partnership Project, "LTE; Evolved Universal Terrestrial Radio Access (E-UTRA) Radio Resource Control (RRC); Protocol specification", (3GPP TS 36.331 version 12.4.1 Release 12), ETSI TS 136 331 V12.4.1, Feb. 1, 2015, pp. 1-415, ETSI.

3rd Generation Partnership Project, "3rd Generation Partnership Project; Technical Specification Group Radio Access Network; Study on provision of low-cost Machine-Type Communications (MTC) User Equipments (UEs) based on LTE (Release 12)", Technical Report, 3GPP TR 36.888 V12.0.0, Jun. 6, 2013, pp. 1-55, 3GPP, France.

3rd Generation Partnership Project, "LTE; Evolved Universal Terrestrial Radio Access (E-UTRA) Physical channels and modulation", Technical Specification (3GPP TS 36.211 version 12.4.0 Release 12), ETSI TS 136 211 V12.4.0, Feb. 1, 2015, pp. 1-126, ETSI.

3rd Generation Partnership Project, "LTE; Evolved Universal Terrestrial Radio Access (E-UTRA) Physical layer procedures", Technical Specification, (3GPP TS 36.213 version 12.4.0 Release 12), ETSI TS 136 213 V12.4.0, Feb. 1, 2015, pp. 1-227, ETSI.

3rd Generation Partnership Project, "LTE; Evolved Universal Terrestrial Radio access (E-UTRA); Medium Access Control (MAC) protocol specification", Technical Specification, (3GPP TS 36.321 version 12.5.0 Release 12), ETSI TS 136 321 V12.5.0, Apr. 1, 2015, pp. 1-79, ETSI.

Ericsson et al., "New WI proposal: Further LTE Physical Layer Enhancements for MTC", 3GPP TSG RAN Meeting #65, Edinburgh, Scotland, Sep. 9, 2014, pp. 1-9, RP-141660, 3GPP.

3rd Generation Partnership Project, "LTE; Evolved Universal Terrestrial Radio Access (E-UTRA) Physical layer; Measurements", Technical Specification, (3GPP TS 36.214 version 12.2.0 Release 12), ETSI TS 136 214 V12.2.0, Apr. 1, 2015, pp. 1-18, ETSI.

Ericsson, "HARQ and TTI bundling for REl-13 low complexity and coverage enhanced UEs", 3GPP TSG-RAN WG2 #89bis, Bratislava, Slovakia, Apr. 20, 2015, pp. 1-7, Tdoc R2-151564, 3GPP.

Huawei, "Data Channel Transmission for MTC UEs", 3GPP TSG-RAN WG1 Meeting #80, Athens, Greece, Feb. 9, 2015, pp. 1-3, R1-150040, 3GPP.

Ericsson, "Physical channel timing relationships for MTC", 3GPP TSG-RAN WG1 Meeting #80bis, Belgrade, Serbia, Apr. 20, 2015, pp. 1-3, R1-151206, 3GPP.

Ericsson, "HARQ timing for MTC", 3GPP TSG-RAN WG1 Meeting #81, Fukuoka, Japan, Apr. 25, 2015, pp. 1-5, R1-152496, 3GPP.

* cited by examiner $R_c = R_u = 10$ $R_c = R_u > 8$

UPLINK HARQ PROCEDURE FOR MTC OPERATION

RELATED APPLICATIONS

This application claims priority to U.S. Provisional patent Application Ser. No. 62/201,913 filed 6 Aug. 2015, the entire contents of which are incorporated herein by reference.

TECHNICAL FIELD

The solution presented herein generally relates to a wireless terminal in communication with a wireless network node, a method performed by a wireless terminal, a computer program product controlling a wireless terminal in communication with a wireless network node and a wireless network node in communication with the wireless terminal, and in particular to a retransmission procedure, e.g., an uplink Hybrid Automatic Repeat Request (HARQ) procedure in a wireless communication system.

BACKGROUND

Long Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval.

Internet of Things (IoT), and the related concept of Machine-Type Communication (MTC), are an important revenue stream for operators and have significant potential from the operator perspective. It is efficient for operators to be able to serve MTC User Equipments (UEs) using already deployed radio access technology. Therefore 3$^{rd}$ Generation Partnership Project (3GPP) LTE has been investigated as a competitive radio access technology for efficient support of IoT and MTC. Lowering the cost of MTC UEs is an important enabler for implementation of the IoT. Further, many MTC applications will require low operational UE power consumption and are expected to communicate with infrequent bursty transmissions and small-size data packets. In addition, there is a substantial market for the Machine-to-Machine (M2M) use cases of devices deployed deep inside buildings, which would require coverage enhancement in comparison to the defined LTE cell coverage footprint.

3GPP LTE Rel-12 has defined a UE power saving mode allowing long battery lifetime and a new UE category allowing reduced modem complexity. In Rel-13, additional MTC work further reduces UE cost and provides coverage enhancement. See 3GPP TR 36.888 v12.0.0, "Study on Provision of Low-Cost Machine-Type Communications (MTC) User Equipments (UEs) based on LTE (Release 12)." The key element to enable cost reduction is to introduce reduced UE bandwidth of 1.4 MHz in downlink and uplink within any system bandwidth. See 3GPP TR 36.888 v12.0.0, "Study on Provision of Low-Cost Machine-Type Communications (MTC) User Equipments (UEs) based on LTE (Release 12)."

In LTE the system bandwidth can be up to 20 MHz, and this total bandwidth is divided into Physical Resource Blocks (PRBs) of 180 kHz. The Low-Complexity/Low Cost UEs with a reduced UE bandwidth of 1.4 MHz introduced in LTE Rel-13 will only be able to receive a part of the total system bandwidth at a time—a part corresponding to up to 6 PRBs. Here we refer to a group of 6 PRBs as a 'PRB group.' See 3GPP TR 36.888 v12.0.0, "Study on Provision of Low-Cost Machine-Type Communications (MTC) User Equipments (UEs) based on LTE (Release 12)." As used herein LC UEs refers to Low Cost and/or Low Complexity UEs.

In order to achieve the coverage targeted in LTE Rel-13 for LC UEs and other UEs operating delay tolerant MTC applications, time repetition techniques are used in order to allow energy accumulation of the received signals at the UE side. For physical data channels (e.g., Physical Downlink Shared Channel (PDSCH), Physical Uplink Shared Channel (PUSCH), etc.), subframe bundling (e.g., TTI bundling) can be used. When subframe bundling is applied, each Hybrid Automatic Repeat reQuest (HARQ) (re)transmission includes of a bundle of multiple subframes instead of just a single subframe. Repetition over multiple subframes can also be applied to physical control channels. Depending on a UE's coverage situation, different numbers of repetitions will be used. See 3GPP TR 36.888 v12.0.0, "Study on Provision of Low-Cost Machine-Type Communications (MTC) User Equipments (UEs) based on LTE (Release 12)" And 3GPP TS 36.321 v13.2.0, "Evolved Universal Terrestrial Radio Access (E-UTRA); Medium Access Control (MAC) protocol specification."

Transmissions on LTE physical data channels (e.g., PDSCH, PUSCH, etc.) are typically scheduled using Downlink Control Information (DCI) in a Physical Downlink Control Channel (PDCCH). For the mentioned LC UEs with reduced bandwidth, the PDCCH bandwidth cannot be larger than 6 PRBs. Here we refer to the PDCCH supporting LC UEs and enhanced coverage as MTC PDCCH (M-PDCCH). The M-PDCCH will be based on the existing Enhanced PDCCH (EPDCCH).

Legacy UpLink (UL) HARQ is synchronous and typically non-adaptive, where synchronous means the UE is expected to send retransmissions at fixed time after the end of the previous transmission. In LTE, for Frequency Division Duplexing (FDD) and serving cell with frame structure type 1, an HARQ-ACK received on the Physical HARQ Indication Channel (PHICH) assigned to a UE in subframe i is associated with the PUSCH transmission in subframe i−4. For FDD and normal HARQ operation, the UE will, upon detection on a given serving cell of a PDCCH/EPDCCH with DCI format 0/4 and/or a PHICH transmission in subframe n intended for the UE, adjust the corresponding PUSCH transmission in subframe n+4 according to the PDCCH/EPDCCH and PHICH information. A benefit of the synchronous nature of legacy UL HARQ is that there is no need to explicitly signal a process number, e.g., an HARQ process number, because that can be deduced from the subframe number.

Non-adaptive HARQ is also used when possible. In this case, the combined synchronous and non-adaptive HARQ results in low control overhead compared to adaptive and asynchronous HARQ.

For UL HARQ, adaptive operation is also possible. In this case, the UE reads the PHICH for feedback and checks for the PDCCH. If the PDCCH is sent as well, it overrides the PHICH feedback, and more detailed control information can be used to change the UL frequency resources the UE uses for retransmissions or to, for example, request some specific Redundancy Version (RV) to be sent (e.g., a full retransmission grant is sent). In any case, the UL HARQ is still synchronous so that possible retransmissions occur every 8$^{th}$ subframe.

Furthermore, even if the UE receives a HARQ ACK on the PHICH, it does not flush its UL buffer, but instead keeps the Transmission Block (TB) in the transmission buffer. Only after the enhanced NodeB (eNB) explicitly signals the UE to transmit new data (DCI for new transmission in PDCCH), by toggling the New Data Indicator (NDI), does the UE move to the next queued TB. See 3GPP TS 36.321 v12.5.0, $3^{rd}$ Generation Partnership Project, Technical Specification Group Radio Access Network; Evolved Universal Terrestrial Radio Access (E-UTRA) Medium Access Control (MAC) protocol specification (Release 12).

SUMMARY

The solution presented herein uses a physical downlink control channel for machine-type communications, e.g., the M-PDDCH, to enable different repetition levels for control and data transmissions. More particularly, when a wireless terminal detects and correctly decodes a message carried by a physical downlink control channel for machine-type communications that requests retransmissions, the wireless terminal performs adaptive uplink retransmissions according to a retransmission format included in the detected and correctly decoded message. The retransmission format defines at least one of a modulation and coding rate for the retransmissions, a frequency resource for the retransmissions, and a number of repetitions. It will be appreciated that the solution presented herein allows the retransmission format to be adaptive by allowing the retransmission format to be selected and signaled to the wireless terminal in a message transmitted via the physical downlink control channel for machine-type communications. It will further be appreciated that the timing between the data and control channels may be predefined by the standards, specifications, and/or signaled using, e.g., broadcast or unicast Radio Resource Control (RRC) signaling.

One exemplary method performed by a wireless terminal, e.g., a machine-type communication terminal, comprises receiving a grant for uplink transmission from the network node, wherein the received grant indicates a first number of repetitions and transmitting on an uplink shared channel according to the first number of repetitions. This exemplary method further comprises monitoring a first channel for a message a first number of subframes after the wireless terminal transmits on the uplink shared channel according to the first number of repetitions, where the first channel comprises a physical downlink control channel for machine-type communications. If the message is detected and correctly decoded, and if the decoded message requests retransmission, the method comprises performing adaptive uplink retransmission according to a first retransmission format indicated by the decoded message One exemplary wireless terminal comprises a receiver, a transmitter, and a processing circuit. The receiver is configured to receive a grant for uplink transmission from the network node, where the received grant indicates a first number of repetitions. The transmitter is configured to transmit on an uplink shared channel according to the first number of repetitions. The processing circuit is configured to monitor a first channel for a message a first number of subframes after the transmitter transmits on the uplink shared channel according to the first number of repetitions, where the first channel comprises a physical downlink control channel for machine-type communications (MTC). If the processing circuit detects and correctly decodes the message, and if the decoded message requests retransmission, the processing circuit is further configured to perform adaptive uplink retransmission, via the transmitter, according to a first retransmission format indicated by the decoded message.

Another exemplary wireless terminal comprises a receiver module, a transmitter module, and a processing module. The receiver module is configured to receive a grant for uplink transmission from the network node, where the received grant indicates a first number of repetitions. The transmitter module is configured to transmit on an uplink shared channel according to the first number of repetitions. The processing module is configured to monitor a first channel for a message a first number of subframes after the transmitter transmits on the uplink shared channel according to the first number of repetitions, where the first channel comprises a physical downlink control channel for machine-type communications (MTC). If the processing module detects and correctly decodes the message, and if the decoded message requests retransmission, the processing module is further configured to perform adaptive uplink retransmission, via the transmitter, according to a first retransmission format indicated by the decoded message.

Another exemplary embodiment comprises a computer program product stored in a non-transitory computer readable medium for controlling a wireless terminal in communication with a wireless network node. The computer program product comprises software instructions that when run on the wireless terminal, causes the wireless terminal to receive a grant for uplink transmission from the network node, where the received grant indicates a first number of repetitions, transmit on an uplink shared channel according to the first number of repetitions, and monitor a first channel for a message a first number of subframes after the wireless terminal transmits on the uplink shared channel according to the first number of repetitions, where the first channel comprises a physical downlink control channel for machine-type communications. If the message is detected and correctly decoded, and if the decoded message requests retransmission, the software instructions, when run on the wireless terminal, causes the wireless terminal to perform adaptive uplink retransmission according to a first retransmission format indicated by the decoded message.

Another exemplary method performed by a network node, e.g., a base station or eNB, comprises transmitting a grant for uplink transmission to the wireless terminal, wherein the transmitted grant indicates a first number of uplink repetitions, and transmitting a message to the wireless terminal via a first channel comprising a physical downlink control channel for machine-type communications to provide an adaptive retransmission format to the wireless terminal a first number of subframes after the wireless terminal transmits on an uplink shared channel according to the first number of uplink repetitions, the adaptive retransmission format being for a subsequent uplink retransmission from the wireless terminal.

One exemplary network node comprises a transmitter, a receiver, and a processing circuit. The transmitter is configured to transmit a grant for uplink transmission to the wireless terminal, where the transmitted grant indicates a first number of repetitions. The processing circuit is configured to generate a message for a first channel comprising a physical downlink control channel for machine-type communications, where the message provides an adaptive retransmission format to the wireless transmitter a first number of subframes after the wireless terminal transmits on an uplink shared channel according to the first number of repetitions, the adaptive retransmission format being for a subsequent uplink retransmission from the wireless terminal. The transmitter is further configured to transmit the message via the first channel.

Another exemplary network node comprises a transmitter module, a receiver module, and a processing module. The transmitter module is configured to transmit a grant for uplink transmission to the wireless terminal, where the transmitted grant indicates a first number of repetitions. The processing module is configured to generate a message for a first channel comprising a physical downlink control channel for machine-type communications, where the message provides an adaptive retransmission format to the wireless transmitter a first number of subframes after the wireless terminal transmits on an uplink shared channel according to the first number of repetitions, the adaptive retransmission format being for a subsequent uplink retransmission from the wireless terminal. The transmitter module is further configured to transmit the message via the first channel.

Another exemplary embodiment comprises a computer program product stored in a non-transitory computer readable medium for controlling a wireless network node in communication with a wireless terminal. The computer program product comprises software instructions that when run on the wireless network node, causes the wireless network node to transmit a grant for uplink transmission to the wireless terminal, wherein the transmitted grant indicates a first number of uplink repetitions, and transmit a message to the wireless terminal via a first channel comprising a physical downlink control channel for machine-type communications to provide an adaptive retransmission format to the wireless terminal a first number of subframes after the wireless terminal transmits on an uplink shared channel according to the first number of uplink repetitions, the adaptive retransmission format being for a subsequent uplink retransmission from the wireless terminal.

DETAILED DESCRIPTION

Figure 1:
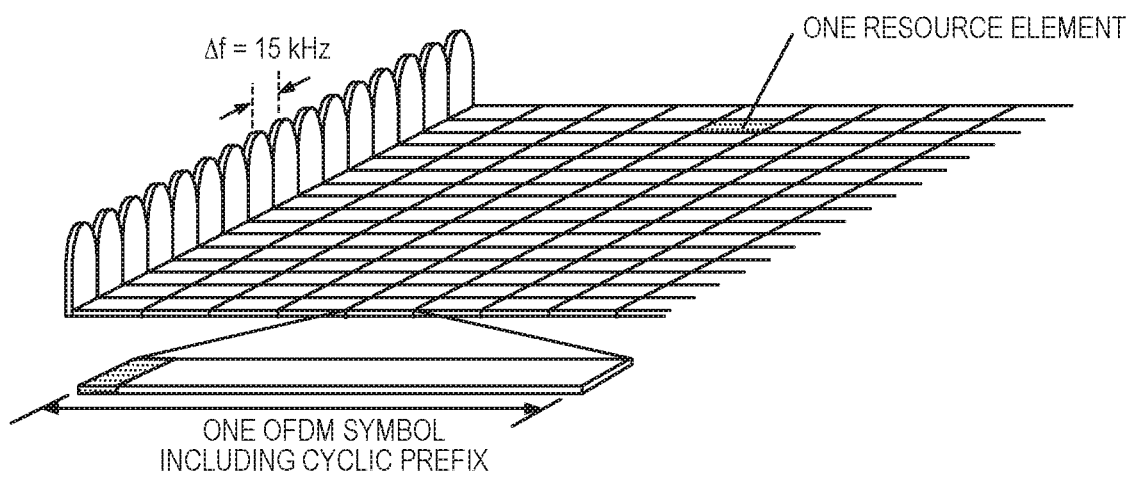
FIG. 1 shows an example of an LTE downlink physical resource.

The solution presented herein provides flexibility for retransmissions used for machine-type communications (MTC). As discussed below, the solution presented herein generally applies to low cost/low complexity (LC) UEs and/or Coverage Enhanced/Coverage Enhancement (CE) UEs, including but not limited to MTC UEs, enhanced MTC (eMTC) UEs, CE Rel-13 UEs, and narrow band IoT (NB-IoT) UEs, which represent those UEs having access to network services via evolved universal terrestrial radio access (E-UTRA) with a channel bandwidth limited to 180 kHz. In addition, the solution presented herein generally applies to bandwidth reduced (BR) UEs, which represent those UEs operating in the DL and UL with a limited channel bandwidth of 6 PRBs, and bandwidth reduced low complexity (BL) UEs. For simplicity, the wireless terminal/UE applicable to the solution presented is any low cost/low complexity, coverage enhanced/coverage enhancement, MTC, eMTC, CE Rel-13, NB-IoT, BR, and BL wireless terminal. Further, the solution presented herein references hybrid automatic repeat request (HARQ), which may be characterized as synchronous/asynchronous, which relates to the flexibility in the time domain, as well as adaptive/non-adaptive, which relates to the flexibility in the frequency domain[1]. As understood by those skilled in the art, and as defined by "4G: LTE/LTE-Advanced for Mobile Broadband," asynchronous retransmission, e.g., asynchronous HARQ retransmission, implies that retransmissions can occur at any time, while synchronous retransmission, e.g., synchronous HARQ, implies that retransmissions occur at a fixed time after the previous transmission. For example, if one PUSCH transmission fails, its retransmission (starting with the associated M-PDCCH carrying the ACK/NACK) for asynchronous HARQ does not come at a predetermined time. For synchronous HARQ retransmission, however, the retransmission does come at a predetermined time. Also as understood by those skilled in the art, and as defined by "4G: LTE/LTE-Advanced for Mobile Broadband," adaptive retransmission, e.g., adaptive UL HARQ retransmission, implies that the frequency location, and possibly the transmission format, can change between transmissions, while non-adaptive retransmission, e.g., non-adaptive UL HARQ retransmission, implies that the retransmission must occur at the same frequency resources and with the same transmission format as the initial transmission. It will be appreciated that adaptive UL retransmission, e.g., adaptive UL HARQ retransmission, represents a retransmission sent by an adaptive repeat request protocol, e.g., an adaptive HARQ protocol. As indicated on pp. 250-251 of "4G: LTE/LTE-Advanced for Mobile Broadband," an "adaptive hybrid-ARQ protocol implies that the frequency location and possibly also the more detailed transmission format can be changed between retransmissions." Thus, an adaptive UL retransmission refers to the ability to adapt or change the frequency location and possibly also the more detailed transmission format of UL retransmission can be changed between UL retransmissions. Before further discussing the solution presented herein, the following first provides some additional background to support the detailed description of the solution presented herein.

[1] See Chapter 12 of "4G: LTE/LTE-Advanced for Mobile Broadband," 2nd Edition 2013

The maximum BandWidth (BW) Rel-13 LC UEs can read in any system is 6 PRBs at a time. Thus, legacy channels, e.g., a Physical Hybrid Automatic Repeat Request (HARQ) Indication Channel (PHICH), a Physical Downlink Control Channel (PDCCH), etc., cannot be used. Thus, the PDCCH for MTC, e.g., the M-PDDCH, will be the downlink control channel used for the LC UEs.

Figure 2:
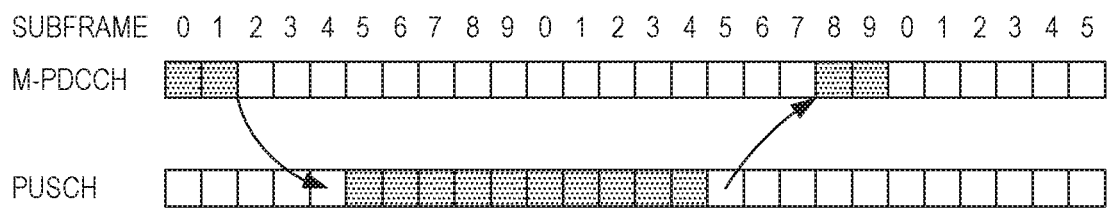
FIG. 2 shows an example of one UL transmission.

In addition, a CE feature requires UEs to use multiple repetitions of physical channel transmissions depending on the UE coverage enhancement level. Because the UE needs to account for possible downlink control channel repetitions, as well as PUSCH repetitions, in between, the possible UL retransmissions cannot always occur eight subframes after the end of the previous transmission. See the example shown in FIG. 2, where the M-PDCCH always takes two subframes. In this case, even if the fixed timing between the end of the M-PDDCH and the start of the PUSCH are kept constant, the earliest possible retransmission opportunity would be much delayed compared to existing UL HARQ operation.

Because the control channels may need to be repeated, depending on the UE coverage level, it is desirable to minimize the amount of control the UE needs to read when repetitions are used. A similar scheme that has been used since Rel-8, however, is not possible because of the timing issues and the possible lack of a PHICH.

The solution presented herein enables UL HARQ to be used for LC and/or CE Rel-13 UEs with the aforementioned restrictions. In general, the UE monitors a first channel, e.g., an M-PDCCH, for a message a first number of sub-frames after the UE transmits on the UL shared channel according to a first number of repetitions. If the message is detected and correctly decoded, and if the decoded message requests retransmission, the UE performs adaptive UL retransmission according to a first retransmission format indicated by the decoded message.

Figure 3:
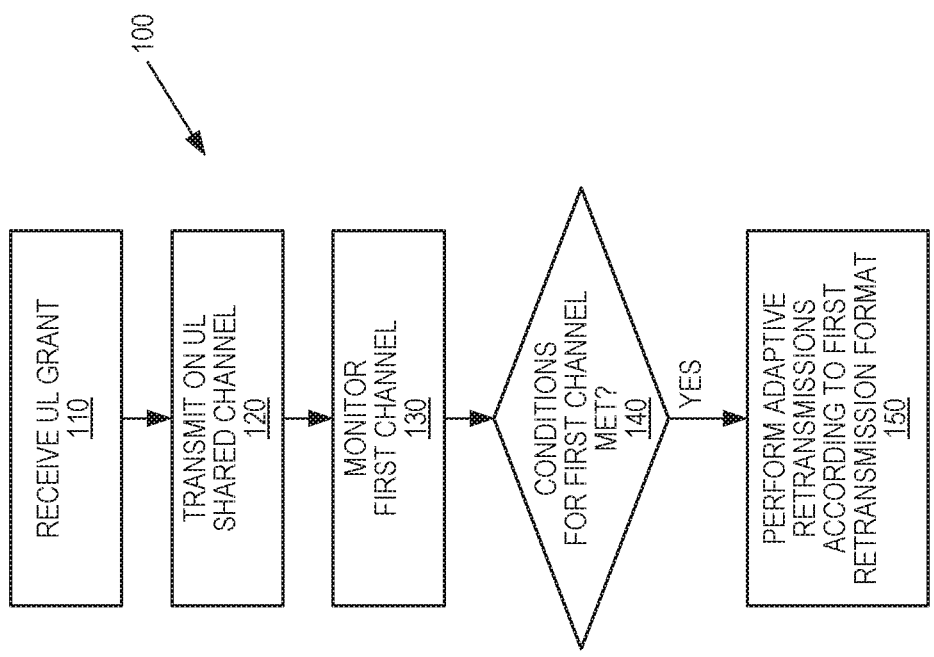
FIG. 3 shows one exemplary method for a wireless terminal.

FIG. 3 shows one exemplary method 100 performed by a wireless terminal 400, e.g., a machine-type communication terminal. The method 100 comprises receiving a grant for uplink transmission from a network node 300, e.g., a base station or eNB, where the received grant indicates a first number of repetitions (block 110). It will be appreciated that in some embodiments, the grant for UL transmission comprises a downlink control information (DCI) indicating a grant for random access channel (RACH) Msg3 transmission. The method further comprises transmitting on the UL shared channel according to the first number of repetitions (block 120) and monitoring a first channel for a message a first number of subframes after the wireless terminal 400 transmits on an uplink shared channel according to the first number of repetitions (block 130). The first channel comprises a physical downlink control channel for machine-type communications. As used herein, a physical downlink control channel "for machine-type communications" refers to any physical downlink control channel that can be received by any applicable wireless terminal, including low cost/low complexity, coverage enhanced/coverage enhancement, MTC, eMTC, CE Rel-13, NB-IoT, BR, and BL wireless terminals, including but not limited to, the M-PDCCH and the narrowband PDCCH (N-PDCCH). If the message carried by the first channel is detected and correctly decoded, and if the decoded message requests retransmission (block 140), the method includes performing adaptive uplink retransmission according to a first retransmission format indicated by the decoded message (block 150). In one exemplary embodiment, the method further comprises performing non-adaptive retransmission according to a second retransmission format if the message is not detected, is not correctly decoded, and/or does not request retransmission. The second retransmission format comprises a currently controlling retransmission format, where the currently controlling retransmission format comprises a retransmission format previously received from the network node 300, e.g., the transmission format defined by the received grant or defined by a subsequent retransmission format received by the wireless terminal 400 after the received grant.

Figure 4:
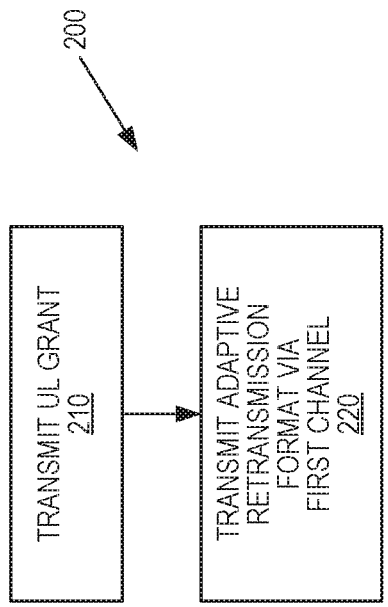
FIG. 4 shows one exemplary method for a network node.

FIG. 4 shows one exemplary method 200 performed by a network node 300, e.g., a base station or eNB. The method 200 comprises transmitting a grant for uplink transmission to a wireless terminal 400, e.g., a machine-type communication terminal, where the transmitted grant indicates a first number of uplink repetitions (block 210). The method further comprises transmitting a message to the wireless terminal 400 via a first channel comprising a physical downlink control channel for machine-type communications to provide an adaptive retransmission format to the wireless terminal 400 a first number of subframes after the wireless terminal 400 transmits on an uplink shared channel according to the first number of uplink repetitions (block 220), where the adaptive retransmission format is for a subsequent UL retransmission from the wireless terminal 400.

Figure 5:
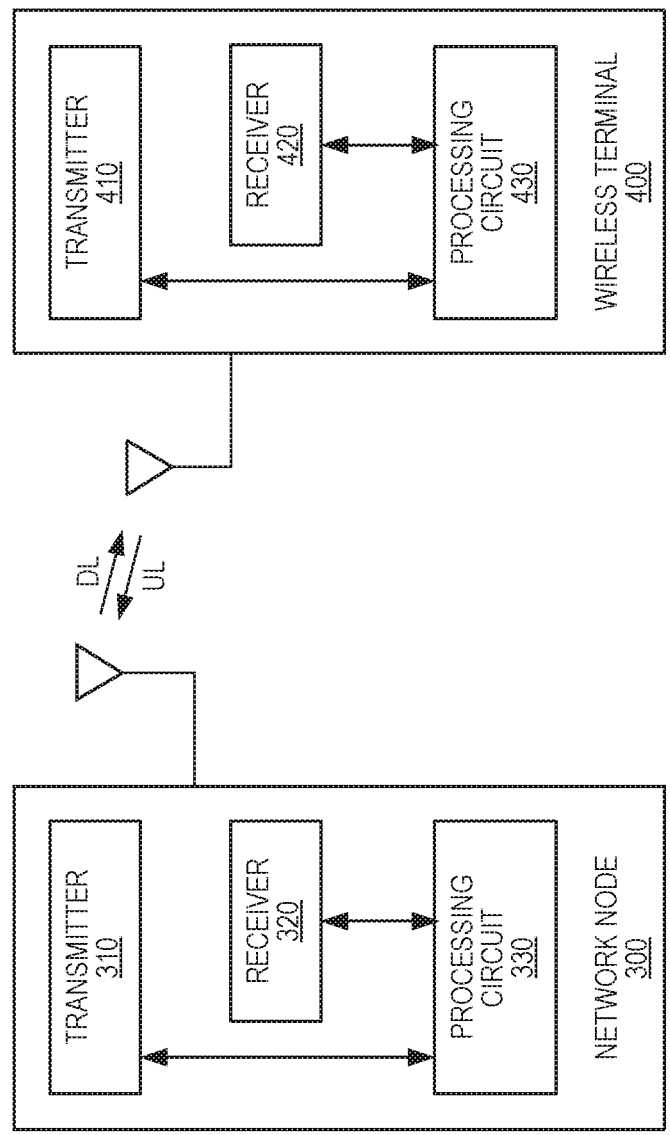
FIG. 5 shows an exemplary wireless network with a network node and wireless terminal.

FIG. 5 shows an exemplary wireless network comprising a network node 300, e.g., a base station or eNB, in communication with a wireless terminal 400, e.g., a machine-type communication terminal. The wireless terminal 400 comprises a transmitter 410, a receiver 420, and a processing circuit 430. The receiver 420 is configured to receive a grant for uplink transmission from the network node 300, where the received grant indicates a first number of repetitions. The transmitter 410 is configured to transmit on an uplink shared channel according to the first number of repetitions. The processing circuit 430 is configured to monitor a first channel for a message a first number of subframes after the transmitter 410 transmits on the uplink shared channel according to the first number of repetitions. The first channel comprises a physical downlink control channel for machine-type communications. If the message carried by the first channel is detected and correctly decoded, and if the decoded message requests retransmission, the processing circuit 430 is configured to perform adaptive uplink retransmission, via the transmitter 410, according to a first retransmission format indicated by the decoded message. In one exemplary embodiment, the processing circuit 430 is further configured to perform non-adaptive retransmission, via the transmitter 410, according to a second retransmission format if the message is not detected, is not correctly decoded, and/or does not request retransmission. The second retransmission format comprises a currently controlling retransmission format, where the currently controlling retransmission format comprises a previously received retransmission format, e.g., the transmission format defined by the received grant or defined by a subsequent retransmission format received by the wireless terminal 400 after the received grant.

The network node 300 comprises a transmitter 310, a receiver 320, and a processing circuit 330. The transmitter 310 is configured to transmit a grant for uplink transmission to the wireless terminal 400, where the transmitted grant indicates a first number of repetitions. The processing circuit 330 is configured to generate a message for a first channel comprising a physical downlink control channel for machine-type communications, where the message provides an adaptive retransmission format to the wireless terminal 400 a first number of subframes after the wireless terminal 400 transmits on the UL shared channel according to the first number of repetitions, where the adaptive retransmission format is for a subsequent uplink retransmission transmitted from the wireless terminal 400 and received by the receiver 320. The transmitter 310 is further configured to transmit the message via the first channel.

Figure 7:
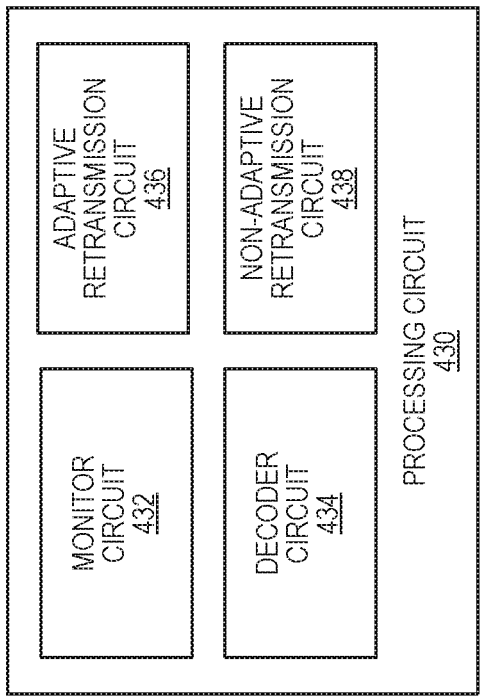
FIG. 7 shows a block diagram of an exemplary processing circuit for the wireless terminal.
Figure 6:
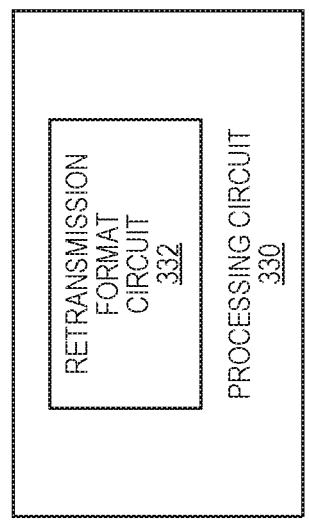
FIG. 6 shows a block diagram of an exemplary processing circuit for the network node.
Figure 8A:
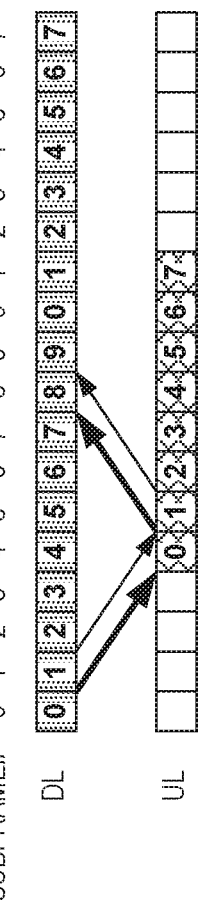
FIGS. 8A-8D show timing of exemplary parallel UL HARQ processes when $R_c = R_u \leq 6$.
Figure 8B:
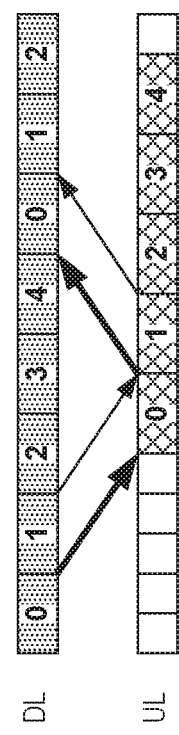
Figure 8C:
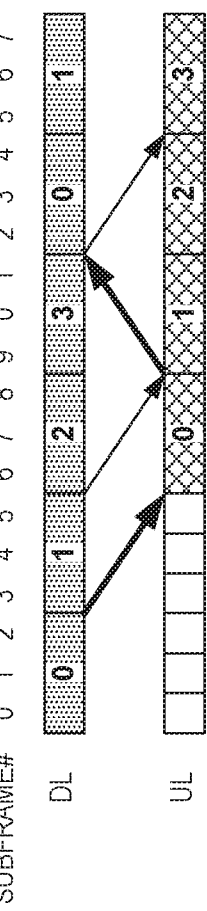
Figure 8D:
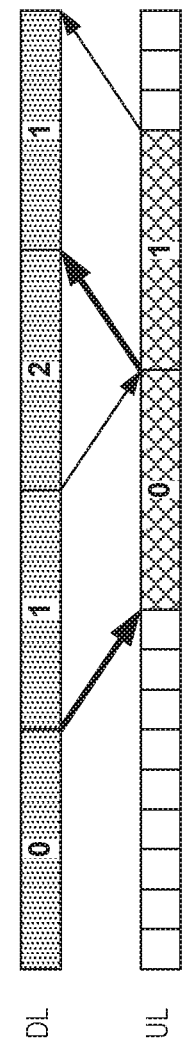
Figure 9A:
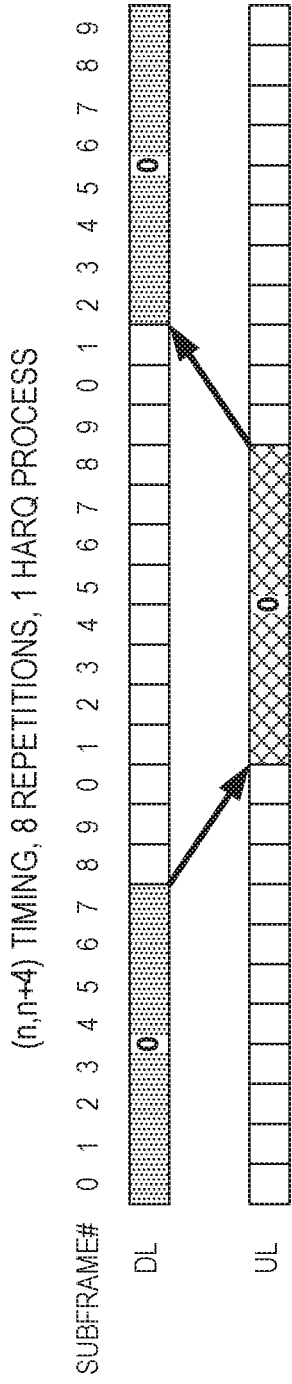
FIGS. 9A-9B show timing of exemplary parallel UL HARQ processes when $R_c = R_u > 6$.
Figure 9B:
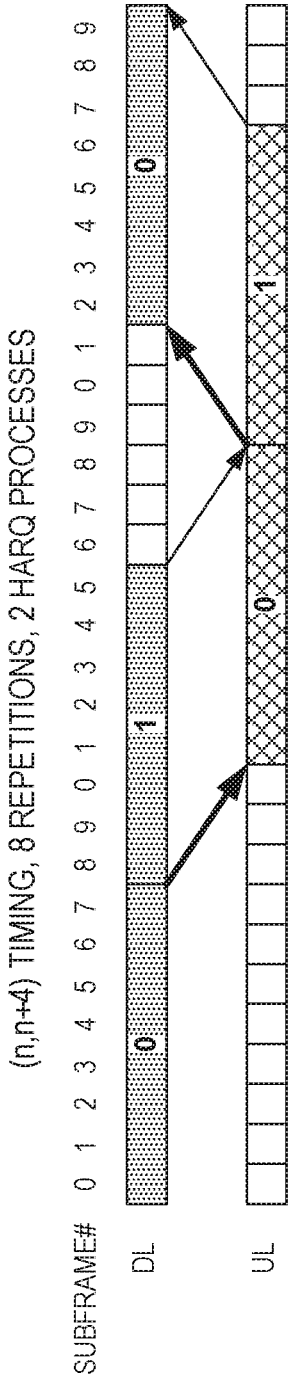
Figure 10:
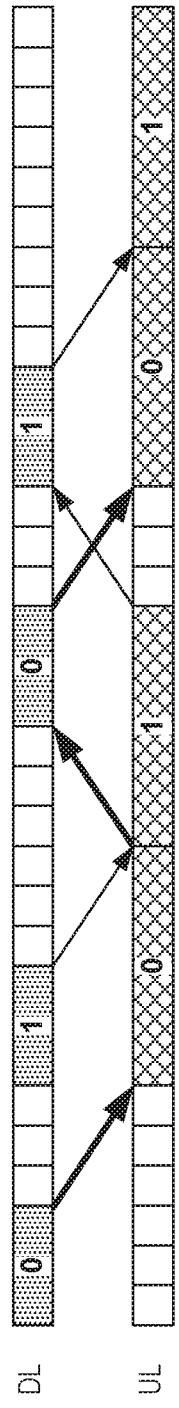
FIG. 10 shows timing of an exemplary parallel UL HARQ process when $R_c < R_u$.
Figure 11:
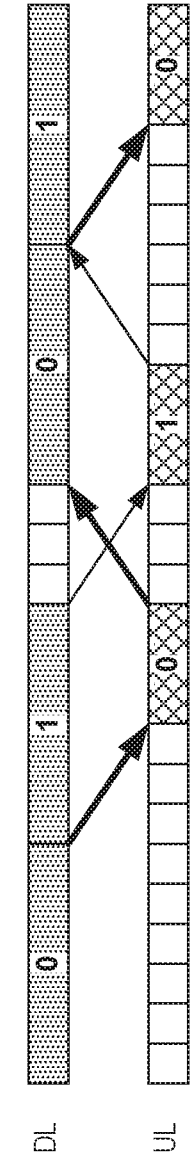
FIG. 11 shows timing of an exemplary parallel UL HARQ process when $R_c > R_u$.
Figure 12A:
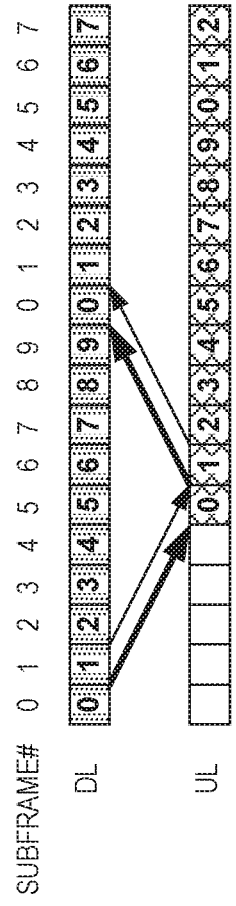
FIGS. 12A-12D show timing of more exemplary parallel UL HARQ processes when $R_c = R_u \leq 8$.
Figure 12B:
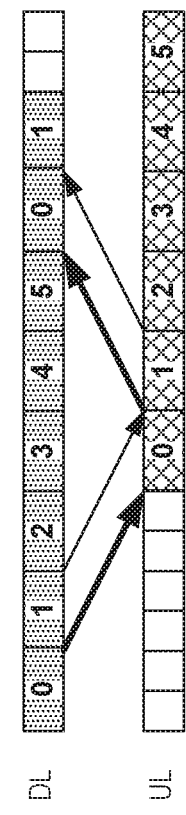
Figure 12C:
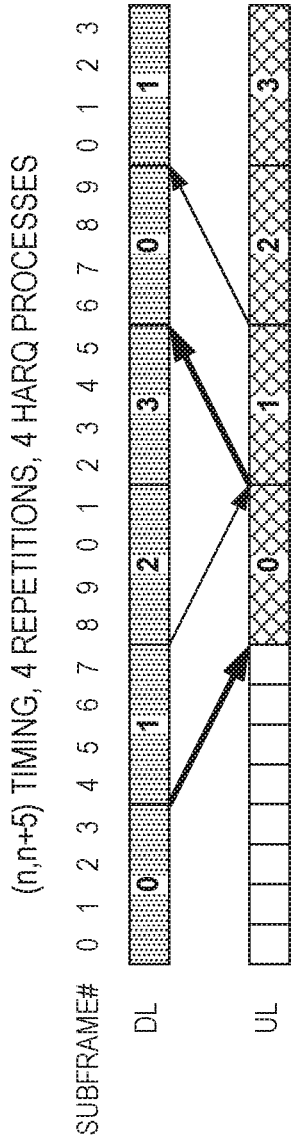
Figure 12D:
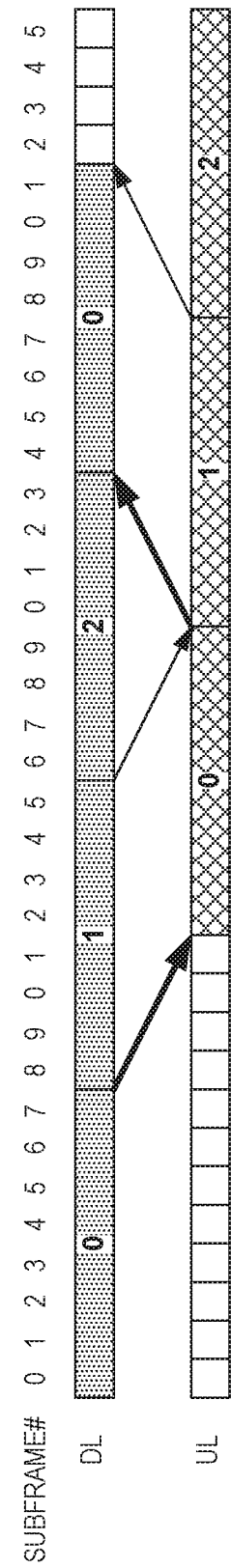
Figure 13A:
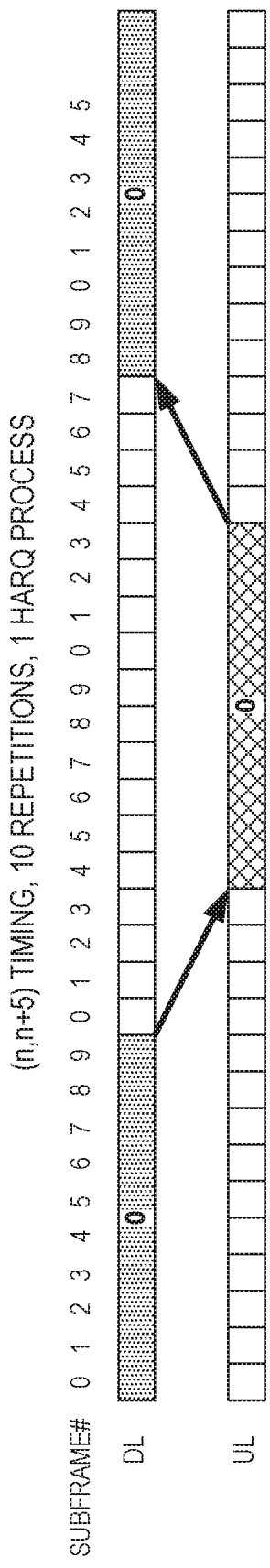
FIGS. 13A-13B show timing of more exemplary parallel UL HARQ processes when $R_c = R_u > 8$.
Figure 13B:
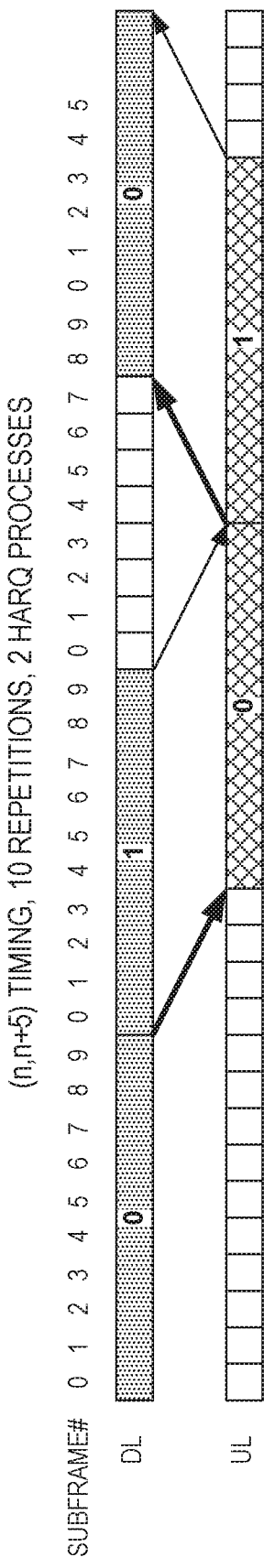
Figure 14:
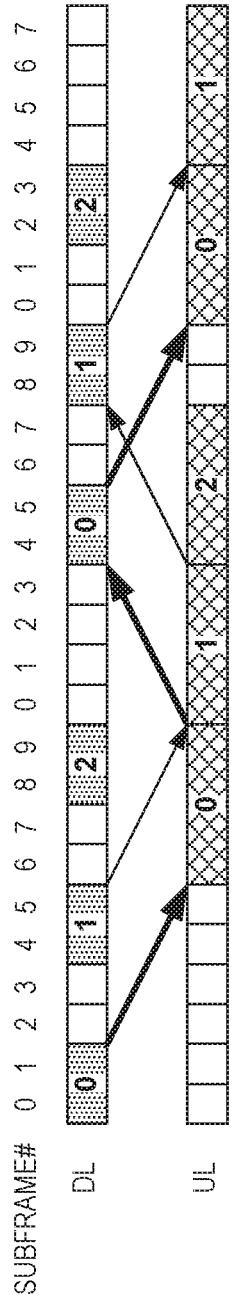
FIG. 14 shows timing of another exemplary parallel UL HARQ process when $R_c < R_u$.
Figure 15:
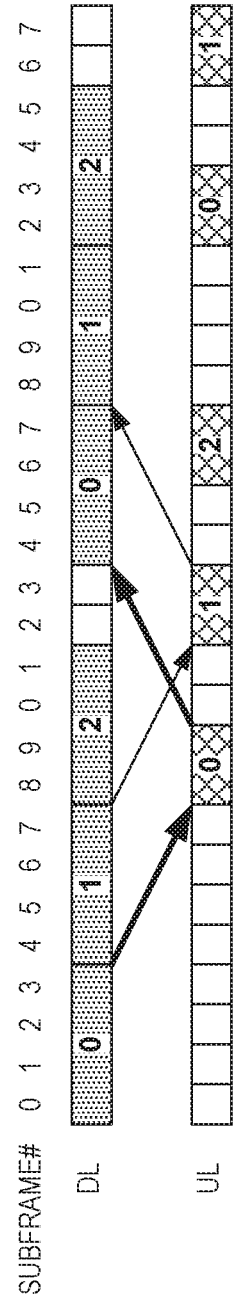
FIG. 15 shows timing of another exemplary parallel UL HARQ process when $R_c > R_u$.

FIGS. 6 and 7 show exemplary block diagrams for the network node and wireless terminal processing circuits 330, 430 of FIG. 5. Processing circuit 330 comprises a retransmission format unit 332 configured to generate the message for the first channel, which comprises a physical downlink control channel for machine-type communications. The first channel provides the message, which defines an adaptive retransmission format, to the wireless terminal 400 for uplink retransmissions transmitted by the wireless terminal 400 and received by the receiver 320. Processing circuit 430 comprises a monitor unit 432, a decoder unit 434, an adaptive retransmission unit 436, and a non-adaptive retransmission unit 438. The monitor unit 432 is configured to monitor a first channel for a message a first number of subframes after the wireless terminal 400 transmits on the uplink shared channel according to the first number of repetitions, wherein the first channel comprises a physical downlink control channel for machine-type communications. The decoder unit 434 is configured to decode the message. The adaptive retransmission unit 436 is configured to perform adaptive uplink retransmission according to a first retransmission format indicated by the decoded message if the message is detected and correctly decoded, and if the decoded message requests retransmission. The non-adaptive retransmission unit 438 is configured to perform non-adaptive retransmission according to a second retransmission format if the message is not detected, is not correctly decoded, and/or does not request retransmission, wherein the second retransmission format comprises a currently controlling retransmission format comprising a retransmission format previously received by the wireless terminal 400. The processing circuits 330, 430 and the various elements in each of these processing circuits 330, 430 may be embodied in hardware, including an application specific integrated circuit (ASIC), where software (including firmware, resident software, microcode, etc.) executed on the hardware configures the hardware according to the processes and algorithms disclosed herein.

While the description associated with FIGS. 3-7 provides a general description of the solution presented herein, the following provides exemplary details for implementing this solution. In one exemplary embodiment, the UE follows the following rules for UL HARQ feedback:

When the UE gets a Discontinuous Transmission (DTX) (e.g., no feedback), the UE sends a synchronous and non-adaptive retransmission. The synchronous retransmission timing depends on fixed timing between control and data channels, and additionally on the number of repetitions required for the control and data channels.

When the UE detects and decodes a message transmitted via the M-PDDCH, the UE acts as instructed in the decoded M-PDDCH message.

Options include ACK but no new data coming, ACK with new data, or NACK and a grant for retransmission.

It will further be appreciated that the solution presented herein defines the timing aspects for proper HARQ operation. The solution presented herein assumes a full-duplex FDD system for ease of description. Those skilled in the art, however, will appreciate that the solution presented herein applies to other types of systems, including but not limited to Time Division Duplexing (TDD) and half-duplex FDD, where synchronous versus asynchronous retransmission and non-adaptive versus adaptive retransmission occurs. In addition, it will be appreciated that the solution presented herein makes it possible to use uplink HARQ with different repetition levels for both control and data transmissions, and details the timing characteristics and the maximum number of simultaneous HARQ processes that could be supported.

The solution presented herein saves resources on control channels because there does not need to be explicit signaling of unsuccessful transmissions in general. In particular, the eNB needs to send explicit NACK with retransmission grant to the UE only in the case where the eNB wants to signal the UE to change the used UL resources. Also, in the default case, the HARQ is synchronous based on the number of repetitions of M-PDCCH. The M-PDCCH configuration is static for the UE unless explicitly changed, and the timing of the retransmissions can be calculated when the number of control channel repetitions is known, where the number of control channel repetitions may be provided by the DCI (in the M-PDCCH).

It will further be appreciated that the same scheme can be used for Msg3 transmission during the Random Access procedure, where Msg3 represents the RACH Message 3, which is the first scheduled UL transmission on the UL shared channel (UL-SCH), and which occurs after the Random Access Response generated by the Medium Access Control (MAC) on the DL-SCH. The initial grant for Msg3 comes in the Random Access Response (RAR), after which possible retransmissions are performed as described above. There is a separate configuration for the maximum number of Msg3 retransmissions in System Information (SI).

The existing synchronous UL HARQ operation can be extended to accommodate the potential repetitions of M-PDCCH and PUSCH. Although the concepts and principles are generally applicable to many use cases, the discussion here focuses on the MTC use case. In the following, "UE" refers to and LC/CE UE, e.g., an MTC UE, unless explicitly stated otherwise.

To better understand the solution presented herein, the following provides some details regarding the M-PDCCH. An M-PDCCH candidate is defined by the combination of {L, R}, where L represents the Enhanced Control Channel Element (ECCE) Aggregation Level (AL) within a subframe, and R represents the number of repetitions across subframes, and where L is the same within R subframes. The M-PDCCH search space may include blind decoding candidates of varying number of repetitions across subframes. The UE-specific M-PDCCH search space, that is, the set of M-PDCCH candidates of {L, R}, is configured by the Radio Resource Control (RRC) for unicast data transmission. For broadcast data transmission, the RRC configuration may not available, and the common search space has to be used, where M-PDCCH candidates of {L, R} need to be predefined in the specification or provided by system information.

The UE monitors the M-PDCCH by attempting to decode each of the M-PDCCH candidates in the relevant search space according to the monitored DCI formats. The starting subframe of M-PDCCH candidates to monitor is configured for UE-specific search space at least for UEs in coverage enhancement. If in the search space, there are no multiple M-PDCCH candidates that only differ in number of repetitions R, then there is no ambiguity in the ending subframe of an M-PDCCH candidate. For example, if the eNodeB configures the M-PDCCH such that R=2 for all M-PDCCH candidates, then the UE knows that the M-PDCCH (if sent) is always repeated in two subframes. In this case, if the M-PDCCH starts in subframe n, then it ends in subframe n+1. For this type of M-PDCCH configuration, the scheduled PUSCH transmission may start at subframe of index:

$$n+R-1+D, \qquad (1)$$

where n represents the start subframe index of the M-PDCCH, R represents the number of repetitions across subframes for the M-PDCCH, and D represents the delay between the end of the M-PDCCH and the start of the PUSCH. When legacy control-data processing timing is assumed, e.g., D=4.

On the other hand, if in the search space there are multiple M-PDCCH candidates that only differ in the number of repetitions R, there is ambiguity in the ending subframe of an M-PDCCH candidate. For example, if eNodeB configures that R={1, 2, 4} for all L in the search space, and the M-PDCCH starts in subframe n, then $R_{L,max}$=4. In this case, the M-PDCCH may end in subframe n, or in subframe n+1, or in subframe n+3. For this type of M-PDCCH configuration, the scheduled PUSCH transmission may start at subframe of index:

$$n+R_{L,max}-1+D, \qquad (2)$$

where n represents the start subframe index of M-PDCCH, $R_{L,max}$ represents the max possible number of repetitions across subframes for M-PDCCH candidates of aggregation level L, L represents the aggregation level of the successfully decoded M-PDCCH candidate, and D represents the delay between the end of M-PDCCH and the start of PUSCH.

One exemplary procedure for synchronous UL HARQ is as follows:
  The UE receives a grant for a new UL transmission, which indicates, among other necessary information, the number of repetitions the UE uses (first M-PDCCH in FIG. 2).
  Set retransmission counter count=0.
  The UE transmits on the indicated resources on the PUSCH, with the repetitions as instructed in the UL grant.
  The UE listens for the M-PDCCH starting in subframe n+k, where n represents the last repetition of PUSCH (k=4 in legacy operation).
  If the UE detects no control (=DTX) and count<the maximum number of retransmissions:
    The UE performs synchronous and non-adaptive retransmission
      Retransmission is started on subframe (n+j+k−1+$R_c$); see the synchronous UL HARQ process and timing discussions presented subsequently herein for a detailed discussion of the parameters.
      The same UL resources and number of repetitions are used. Alternatively there is a pre-defined and configured pattern for changing resources used for retransmissions. Also frequency hopping can be accounted for.
    Change the Redundancy Version (RV) as defined.
      If all repetitions in one PUSCH transmission use the same RV, then change the RV similar to legacy. Alternatively, if the repetitions in one PUSCH instance use different RVs according to a pattern, there may not be any need to change the starting RV between the PUSCH transmissions.
    Increase count by one: count=count+1.
  If the UE detects the control channel (e.g., M-PDDCH) and decodes it successfully:
    If feedback is ACK without NDI/grant:
      The UE keeps UL data in buffer, does not retransmit anything.
    If feedback is ACK with new UL grant with New Data Indicator (NDI) set:
      The UE flushes the UL buffer, moves to the next TB, and makes a new transmission (go to start).
    If feedback is NACK with retransmission grant:
      The UE makes retransmission according to the grant.
      Same grant format as new transmission is used, without NDI set.
      Increase count by one: count=count+1.
    If count=the maximum number of retransmissions, the UE exits the HARQ procedure; otherwise, the UE goes back to monitoring the M-PDCCH.

A new format is needed for just transmitting an ACK on the downlink control channel without a new grant. It could be beneficial to define a short format for this to save repetitions and resource usage.

For NACK transmission with a retransmission grant, it needs to be decided if the synchronous timing will be kept. In one alternative, the synchronous timing is not changed and no DCI field is needed to provide the UL HARQ process ID. In another alternative, the eNB is allowed to change the timing of the retransmission transmissions for more flexible scheduling, in which case a DCI field is needed to provide the UL HARQ process ID information. It will be appreciated that the DCI of each M-PDCCH includes at least a DCI subframe repetition number field and a process number field, e.g., an HARQ process number field. The DCI subframe repetition number field indicates the actual number of repetitions of the M-PDCCH, and may, e.g., comprise 2 bits. The HARQ process number field indicates the HARQ process ID information, and may comprise, e.g., 3 bits. It will be appreciated that the process number represents a mapping to a specific retransmission protocol process, e.g., a process or an instance of a retransmission protocol in the case where a number of possible parallel processes or instances are given numbers or identifiers to uniquely separate them from each other. Thus, the each M-PDCCH may indicate a desired number of repetitions. Otherwise the grant format can be similar as to what it is for initial transmissions, including:
  resource allocation such as the narrowband/PRB group index, the number of PRBs to use;
  if frequency hopping is used, and if so, parameters related to frequency hopping configuration;
  number of repetitions used;
  New data indicator (NDI);
  Modulation and Coding Scheme (MCS) (if not together with # repetitions); and
  Radio Network Temporary Identifier (RNTI) (for example implicitly in CRC as in legacy).

The delay between the end of the subframe the carrying M-PDCCH and the start of the subframe of the corresponding PUSCH depends on, for example, the propagation delay and the UE processing time. In legacy systems, the delay is assumed to be 3 subframes, e.g., if subframe n carries the PDCCH/EPDCCH/PHICH, the corresponding PUSCH is in subframe (n+4). This is called DownLink (DL) (n, n+k) timing below, where k=4 in the legacy systems.

The delay between the end subframe carrying the PUSCH and the start subframe of the subsequent M-PDCCH transmission depends on, for example, the propagation delay and the eNodeB processing time. In legacy systems, the delay is assumed to be 3 subframes, e.g., a HARQ-ACK received on the PHICH in subframe n is associated with the PUSCH transmission in subframe (n-4). This is called UL (n, n+j) timing below, where j=4 in legacy systems.

In legacy systems, there is no repetition for the PDCCH/ EPDCCH/PHICH/PUSCH, and the delay in the UL and DL is the same of 3 subframes.

For an MTC LC/CE UE, the M-PDCCH and PUSCH may both require repetitions. Let $R_c$ represent the number of repetitions for the M-PDCCH, and $R_u$ represent the number of repetitions for the PUSCH. As discussed earlier, $R_c$ may be the actual number of repetitions of a given M-PDCCH transmission, or the maximum possible number of repetitions associated with the given aggregation level of the decoding candidate. $R_u$ is signaled by the eNodeB and has no decoding ambiguity.

In the following, discussions associated with Equations (3) and (4), the UL and DL delay are assumed to be the same. In the following discussions associated with Equation (5), the UL delay is lower than the DL delay, where the DL has (n, n+5) timing, and the UL has (n, n+4) timing. This has the benefit of allowing the UE more time to process the M-PDCCH and prepare for PUSCH transmission.

In this section, which is associated with Equation (3), the HARQ timing and the maximum HARQ processes for each scenario is illustrated assuming (n, n+4) timing. Both UL and DL timing are assumed to be (n, n+4), similar to legacy system.

The maximum number of parallel HARQ processes may be given by:

$$1 + \min\left(\left\lceil \frac{R_u + 6}{R_c} \right\rceil, \left\lceil \frac{R_c + 6}{R_u} \right\rceil\right). \quad (3)$$

The timing of the parallel UL HARQ processes is illustrated in FIGS. 8A-8D when $R_c=R_u$ and the subframes are fully utilized. The maximum number of parallel HARQ processes is also listed in Table 1.

For larger numbers of repetitions, e.g., where $R_u>6$, a maximum of two parallel UL HARQ processes is possible. When a maximum of two parallel UL processes is defined, 1 bit in the DCI is needed to indicate the UL HARQ process ID, if the UL HARQ is not synchronized; no UL HARQ process ID, and thus no HARQ process number field in the DCI, is necessary if the UL HARQ is synchronized.

On the other hand, for simplicity of operation, and also considering the low data rate requirement of MTC UEs, it may desirable to allow only a single HARQ process for larger number of repetitions. Allowing only a single HARQ process also has the benefit of easily accommodating any $R_c$ and $R_u$ values, e.g., no need to assume $R_c=R_u$.

As illustrated in FIGS. 9A, 9B, 10, and 11, When $R_c=R_u>6$ or $R_c \neq R_u$, the subframes are not fully utilized. When the M-PDCCH and PUSCH do not have the same number of repetitions, $R_c \neq R_u$, the PUSCH (re)transmission timing do not look synchronous in that the starting point of the PUSCH (re)transmissions associated with a given transport block is not every X subframes. This is demonstrated in FIG. 10 and FIG. 11. Thus the 'synchronous' UL HARQ should be understood to be that for transmission and retransmission of a given UL transport block, (a) relative timing between the end of the M-PDCCH and the start of the PUSCH is fixed,
(b) relative timing between the end of the PUSCH and the start of the M-PDCCH is fixed, and
(c) there is no ambiguity of the end of the M-PDCCH to the UE. Here the end of the M-PDCCH may or may not be the end of the actual M-PDCCH transmission by the eNB; rather it may be the end of the last possible M-PDCCH hypothesis if multiple hypotheses exist for detecting the M-PDCCH.

TABLE 1

Maximum number of parallel UL HARQ processes for (n, n + 4) timing

| $R_c = R_u$ | Max number of UL HARQ processes |
|---|---|
| 1 | 8 |
| 2 | 5 |
| 3 | 4 |
| 6 | 3 |
| >6 | 2 |

The following, which is associated with Equation (4), illustrates the HARQ timing and the maximum HARQ processes for each scenario assuming (n, n+5) timing. Both UL and DL timing are assumed to be (n, n+5). For LC UEs and CE UEs, it may be necessary to provide an extra subframe for processing time. This is especially true for the processing at the UE.

The maximum number of parallel HARQ processes may be given by:

$$1 + \min\left(\left\lceil \frac{R_u + 8}{R_c} \right\rceil, \left\lceil \frac{R_c + 8}{R_u} \right\rceil\right). \quad (4)$$

The timing of the parallel UL HARQ processes is illustrated in FIGS. 12A-12D when $R_c=R_u$ and the subframes are fully utilized. The maximum number of parallel HARQ processes is also listed in Table 2. For larger numbers of repetitions, e.g., where $R_u>8$, a maximum of 2 parallel HARQ processes is possible. However, for simplicity of operation, and also considering the low data rate requirement of the MTC UEs, it may be desirable to allow only a single HARQ process for larger numbers of repetitions. Allowing only a single HARQ process also has the benefit of allowing any $R_c$ and $R_u$ values, e.g., no need to assume $R_c=R_u$. As illustrated in FIGS. 13A, 13B, 14, and 15, When $R_c=R_u>8$ or $R_c \neq R_u$, the subframes are not fully utilized.

TABLE 2

Maximum number of parallel UL HARQ processes for (n, n + 5) timing

| $R_c = R_u$ | Max number of UL HARQ processes |
|---|---|
| 1 | 10 |
| 2 | 6 |
| 4 | 4 |

TABLE 2-continued

Maximum number of parallel UL HARQ processes for (n, n + 5) timing

| $R_c = R_u$ | Max number of UL HARQ processes |
|---|---|
| 8 | 3 |
| >8 | 2 |

In another exemplary embodiment, the UL and DL timing may be different. Assume that the end of the subframe carrying M-PDCCH and the start of the subframe of the corresponding PUSCH is separated by (k−1) subframes, e.g., (n, n+k) DL timing. Further, assume that the end subframe carrying PUSCH and the start subframe of the subsequent M-PDCCH transmission is separated by (j−1) subframes, e.g., (n, n+j) UL timing. In this general case, the maximum number of parallel HARQ processes may be given by:

$$1 + \min\left(\left\lceil \frac{R_u + k + j - 2}{R_c} \right\rceil, \left\lceil \frac{R_c + k + j - 2}{R_u} \right\rceil\right). \quad (5)$$

Figure 16:
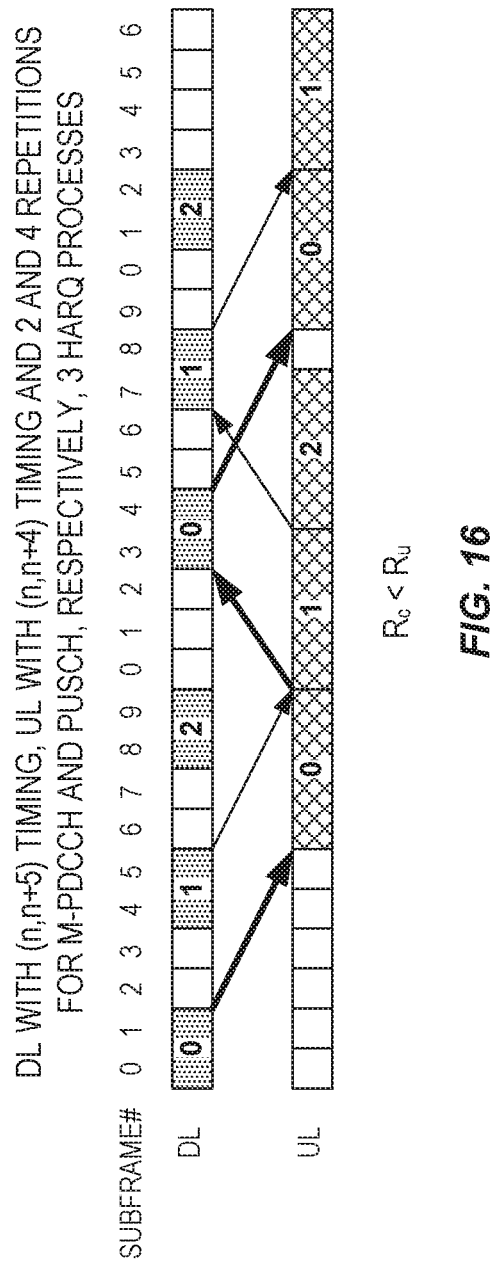
FIG. 16 shows timing of another exemplary parallel UL HARQ process when $R_c < R_u$.

FIG. 16 shows one example, with k=5 and j=4. As shown, the subframes, in general, cannot be fully utilized. This makes it more difficult to operate the scheduler.

The UL HARQ solution presented herein may also be applied to Msg3 in the random access procedure. In particular, Msg3 is sent after the UE receives the Random Access Response (RAR) message from the eNB. The RAR includes the UL grant for Msg3, and should contain all the necessary information needed to send the Msg3. There are, however, some different options on how the Msg3 repetition factor is signaled or derived:

Static repetition factor sent in system information;

Repetition factor derived from the repetition factor initial random access preamble transmission (Msg1) or derived from the RAR (Msg2) repetition factor; or Repetition factor signaled in the UL grant included in RAR.

These options have been presented in 3GPP before, see e.g., R2-152649, "Random Access for Rel-13 Low Complexity and Coverage Enhanced UEs," RAN2 #90, 25-29 May 2015, Fukuoka, Japan. The discussion in the cited contribution applies to PUSCH repetition factor.

In order for the Msg3 transmission to work, the UE would additionally need to know the repetition factor of the M-PDDCH. As the UE is performing random access, no dedicated configuration is available but the UE needs to act based on either predefined information, broadcasted system information, or information obtained during the random access procedure so far. Thus, alternatives on how to derive the M-PDCCH repetition factor for Msg3 transmission include:

Preconfigured set of M-PDCCH repetition factors, where the UE chooses one based on the used repetition factor for the random access preamble. For example:

One alternative is to have the possible repetition factors defined in the specification or standard.

Another alternative is to signal the set of Msg3 M-PDCCH repetition factors in the system information for MTC UEs.

Dynamically signal the M-PDCCH repetition factor for Msg3. For example:

One alternative is to signal in DCI the repetition factor index selecting one factor from a set of possible repetition factors (the same configuration aspects as above apply for this alternative).

Another alternative is to directly signal the repetition factor value in the RAR.

Yet another alternative is to signal a parameter that the UE uses to calculate the repetition factor as a function of the signaled parameter, and optionally as a function of other available information (e.g., the number of used repetitions for the preamble transmission).

When the repetition factor and other parameters are known, the timing aspects of the actual Msg3 and related control channels are similar, and are described elsewhere in this application.

For asynchronous UL HARQ, (n, n+4) timing is assumed for both the UL and DL. Synchronous UL HARQ is not possible when the timing relationship between the M-PDCCH and PUSCH is that the PUSCH starts in subframe n+4, where n represents the subframe where the repetitions of the decoded M-PDCCH message for the UE (corresponding to the PUSCH) ends. This is because there is ambiguity of the end of the M-PDCCH when multiple hypothesis exist for the end point of the M-PDCCH.

For example, if the start subframe of the M-PDCCH is $n_{c0}$, four hypothesis exists for the number of repetitions of the M-PDCCH, $\{R_{c1}, R_{c2}, R_{c3}, R_{c4}\}$, where $R_{c1}<R_{c2}<R_{c3}<R_{c4}$. Assume the eNB used $R_{c2}$ to send the initial M-PDCCH that schedules a PUSCH, (a) If the UE successfully detects the M-PDCCH, then the UE knows the M-PDCCH ended in subframe $n_{c0}+R_{c2}$. Thus, the UE sends the PUSCH transmission starting in subframe $(n_{c0}+R_{c2}+4)$. If retransmission is necessary, the network node (e.g., eNB) sends the M-PDCCH associated with the PUSCH retransmission starting in subframe $(n_{c0}+R_{c2}+R_u+8)$.

(b) If the UE fails to detect the M-PDCCH, the UE does not know which hypothesis of the end subframe of the M-PDCCH is true: n E$\{n_{c0}+R_{c1}, n_{c0}+R_{c2}, n_{c0}+R_{c3}, n_{c0}+R_{c4}\}$. Thus, the UE does not know when to retransmit the PUSCH. Hence the UE cannot automatically retransmit without an explicit M-PDCCH grant. Otherwise, the eNB will have at least two hypothesis about where the PUSCH ends: $\{n_{c0}+R_{c2}+R_u+8, n_{c0}+R_{c4}+R_u+8\}$, where $(n_{c0}+R_{c2}+R_u+8)$ is the value if UE succeeded in detecting M-PDCCH, and where $(n_{c0}+R_{c4}+R_u+8)$ is the maximum value that the UE would use if the UE has failed in detecting M-PDCCH. Hence the eNB also does not know when to start sending the M-PDCCH associated with the PUSCH retransmission.

Thus, in this case the UL HARQ has to be asynchronous, and the UE does not retransmit when the UE fails detect an ACK/NACK (implicit or explicit) from the eNB. The UE only sends PUSCH retransmission according to explicit signaling, e.g., M-PDCCH, from the eNB. As a consequence, the DCI that schedules the PUSCH (re-)transmission needs to contain a field that indicates the UL HARQ process ID of the UE.

Figure 17:
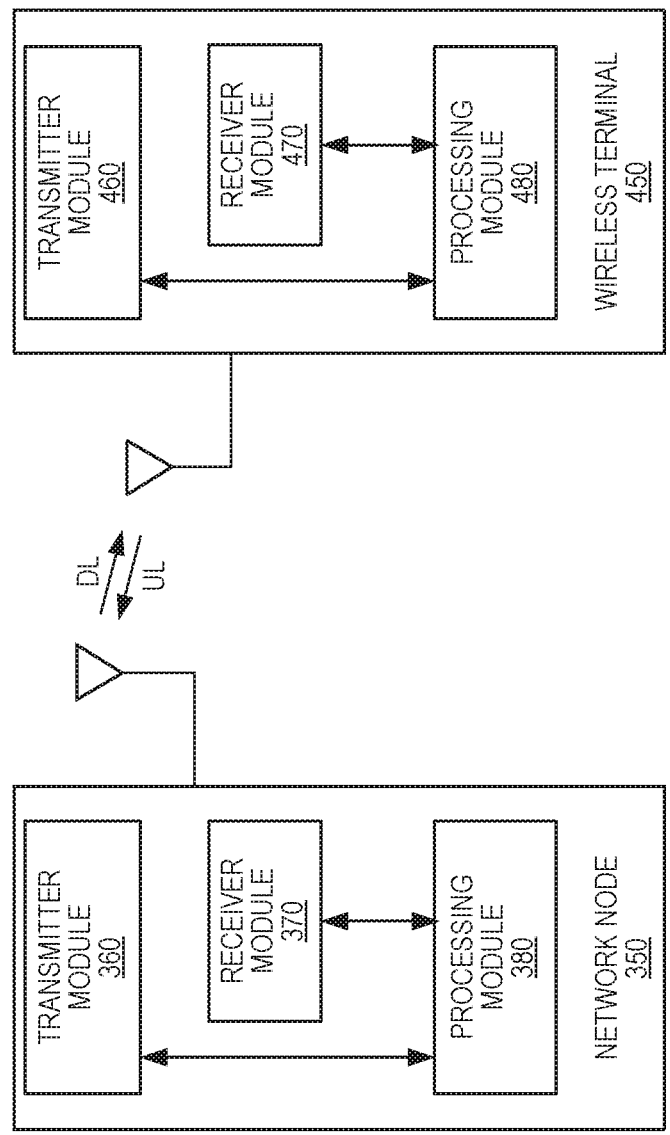
FIG. 17 shows another exemplary wireless network with a network node and wireless terminal.

It will be appreciated that in some embodiments, various elements disclosed herein comprise some kind of module configured to execute the described function. For example, the network node may comprise a network node 350, as shown in FIG. 17, that comprises a transmitter, receiver, and processor implemented as a transmitter module 360, receiver module 370, and processing module 380, respectively, that implement the method 200 of FIG. 4. Similarly, the wireless terminal may comprise a wireless terminal 450 that comprises a transmitter, receiver, and processor implemented as a transmitter module 460, receiver module 470, and processing module 480, respectively, as shown in FIG. 17, that implement the method 100 of FIG. 3.

Figure 19:
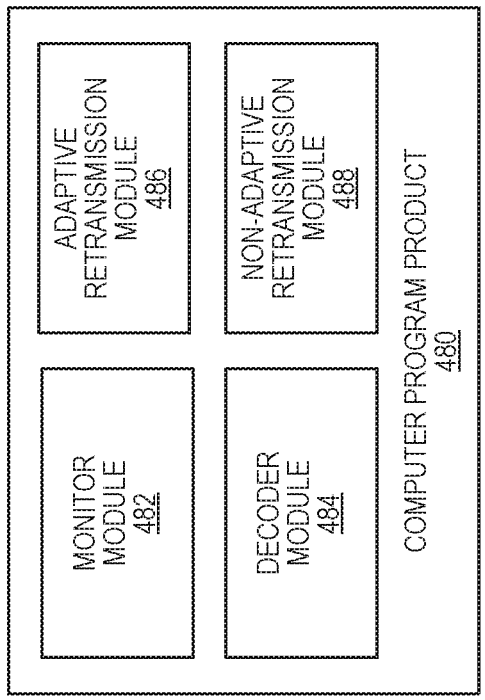
FIG. 19 shows a block diagram of an exemplary computer program product for the processing circuit of the wireless terminal.
Figure 18:
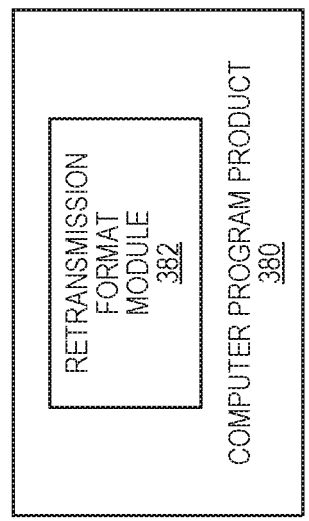
FIG. 18 shows a block diagram of an exemplary computer program product for the processing circuit of the network node.

FIGS. 18 and 19 show exemplary computer program products 350, 450 for the network node and wireless terminal processing circuits 330, 430 of FIG. 5 and/or the network node and wireless terminal processing modules 380, 480 of FIG. 17. Each computer program product 350, 450 may comprise modules for each function performed by the corresponding processing circuit. Computer program product 380 includes a retransmission format module 382 to generate a message for the first channel, which comprises a physical downlink control channel for machine-type communications. The message provides an adaptive retransmission format to the wireless terminal 400, 450 for uplink retransmissions transmitted by the wireless terminal 400, 450 and received by the receiver 320, 370. Computer program product 480 includes a monitor module 482, a decoder module 484, an adaptive retransmission module 486, and a non-adaptive retransmission module 488. The monitor module 482 monitors a first channel for a message a first number of subframes after the wireless terminal 400, 450 transmits on the uplink shared channel according to the first number of repetitions, wherein the first channel comprises a physical downlink control channel for machine-type communications. The decoder module 484 attempts to decode the message. The adaptive retransmission module 486 performs adaptive uplink retransmission according to a first retransmission format indicated by the decoded message if the message is detected and correctly decoded, and if the decoded message requests retransmission. The non-adaptive retransmission module 488 performs non-adaptive retransmission according to a second retransmission format if the message is not detected, is not correctly decoded, and/or does not request retransmission, wherein the second retransmission format comprises a currently controlling retransmission format previously received by the wireless terminal 400, 450 from the network node 300, 350.

As described above, the solution presented herein includes multiple embodiments. One exemplary embodiment comprises a method performed by a wireless terminal in communication with a wireless network node. The method comprises receiving a grant for uplink transmission from the network node, wherein the received grant indicates a first number of repetitions, transmitting on an uplink shared channel according to the first number of repetitions, and monitoring a first channel for a message a first number of subframes after the wireless terminal transmits on the uplink shared channel according to the first number of repetitions. The first channel comprises a physical downlink control channel for machine-type communications. If the message is detected and correctly decoded, and if the decoded message requests retransmission, performing adaptive uplink retransmission according to a first retransmission format associated with the decoded message. This embodiment further comprises performing non-adaptive retransmission according to a second retransmission format if the message is not detected, is not correctly decoded, and/or does not request retransmission, wherein the second retransmission format comprises a currently controlling retransmission format previously received from the network node. Further, the first retransmission format defines at least one of a modulation and coding rate for the retransmissions, a frequency resource for the retransmissions, and a second number of repetitions for the retransmissions.

Another exemplary embodiment comprises a wireless terminal in communication with a wireless network node. The wireless terminal comprises a receiver, transmitter, and processing circuit. The receiver is configured to receive a grant for uplink transmission from the network node, wherein the received grant indicates a first number of repetitions. The transmitter is configured to transmit on an uplink shared channel according to the first number of repetitions. The processing circuit is configured to monitor a first channel for a message a first number of subframes after the transmitter transmits on the uplink shared channel according to the first number of repetitions, where the first channel comprises a physical downlink control channel for machine-type communications. If the message is detected and correctly decoded, and if the decoded message requests retransmission, the processing circuit is further configured to perform adaptive uplink retransmission, via the transmitter, according to a first retransmission format associated with the decoded message. For this embodiment, the processing circuit is further configured to perform non-adaptive retransmission, via the transmitter, according to a second retransmission format if the message is not detected, is not correctly decoded, and/or does not request retransmission, wherein the second retransmission format comprises a currently controlling retransmission format previously received from the network node. Further, the first retransmission format defines at least one of a modulation and coding rate for the retransmissions, a frequency resource for the retransmissions, and a second number of repetitions for the retransmissions.

Another exemplary embodiment comprises a computer program product stored in a non-transitory computer readable medium for controlling a wireless terminal in communication with a wireless network node. The computer program product comprises software instructions that when run on the wireless terminal, causes the wireless terminal to receive a grant for uplink transmission from the network node, wherein the received grant indicates a first number of repetitions, transmit on an uplink shared channel according to the first number of repetitions, and monitor a first channel for a message a first number of subframes after the wireless terminal transmits on the uplink shared channel according to the first number of repetitions, wherein the first channel comprises a physical downlink control channel for machine-type communications. If the message is detected and correctly decoded, and if the decoded message requests retransmission, the software instructions, when run on the wireless terminal, causes the wireless terminal to perform adaptive uplink retransmission according to a first retransmission format associated with the decoded message.

Another exemplary embodiment comprises a method performed by a wireless network node in communication with a wireless terminal. The method comprises transmitting a grant for uplink transmission to the wireless terminal, where the transmitted grant indicates a first number of uplink repetitions, and transmitting a message via a first channel comprising a physical downlink control channel for machine-type communications. A first number of subframes after the wireless terminal transmits on an uplink shared channel according to the first number of uplink repetitions, the transmitted message provides an adaptive retransmission format to the wireless terminal for subsequent uplink retransmissions transmitted by the wireless terminal.

Another exemplary embodiment comprises a wireless network node in communication with a wireless terminal.

The wireless network node comprises a receiver, transmitter, and processing circuit. The transmitter is configured to transmit a grant for uplink transmission to the wireless terminal, where the transmitted grant indicates a first number of repetitions. The processing circuit is configured to generate a message for a first channel comprising a physical downlink control channel for machine-type communications, where the message provides an adaptive retransmission format to the wireless transmitter for subsequent uplink retransmissions transmitted by the wireless terminal and received by the receiver. The transmitter is further configured to transmit the message via the first channel a first number of subframes after the wireless terminal transmits on an uplink shared channel according to the first number of uplink repetitions.

Another exemplary embodiment comprises a computer program product stored in a non-transitory computer readable medium for controlling a wireless network node in communication with a wireless terminal. The computer program product comprises software instructions that when run on the wireless network node, causes the wireless network node to transmit a grant for uplink transmission to the wireless terminal, wherein the transmitted grant indicates a first number of uplink repetitions, and transmit a message via a first channel comprising a physical downlink control channel for machine-type communications, where a first number of subframes after the wireless terminal transmits on an uplink shared channel according to the first number of uplink repetitions, the transmitted message provides an adaptive retransmission format to the wireless terminal for subsequent uplink retransmissions transmitted by the wireless terminal.

The solution presented herein may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

What is claimed is:

1. A method performed by a wireless terminal in communication with a wireless network node, the method comprising:
   receiving a grant for uplink transmission from the network node, wherein the received grant indicates a first number of repetitions;
   transmitting on an uplink shared channel according to the first number of repetitions;
   monitoring a first channel for a message a first number of subframes after the wireless terminal transmits on the uplink shared channel according to the first number of repetitions, wherein the first channel comprises a physical downlink control channel for machine-type communications; and
   if the message is detected and correctly decoded, and if the decoded message requests retransmission, performing adaptive uplink retransmission according to a first retransmission format indicated by the decoded message.

2. The method of claim 1 further comprising performing non-adaptive retransmission according to a second retransmission format if at least one of the message is not detected, the message is not correctly decoded, and the decoded message does not request retransmission, wherein the second retransmission format comprises a currently controlling retransmission format received from the network node before detection of the message.

3. The method of claim 1 wherein the adaptive uplink retransmission comprises asynchronous uplink retransmission, and wherein the message includes downlink control information indicating a process number for the adaptive uplink retransmission.

4. The method of claim 3 wherein the process number comprises a hybrid automatic repeat request (HARQ) process number.

5. The method of claim 1 wherein the first retransmission format defines at least one of a modulation and coding rate for the adaptive uplink retransmission, a frequency resource for the adaptive uplink retransmission, and a second number of repetitions for the adaptive uplink retransmission.

6. The method of claim 1 wherein receiving the grant for uplink transmission comprises receiving a downlink control information (DCI) indicating a grant for random access channel (RACH) Msg3 transmission.

7. A wireless terminal in communication with a wireless network node, the wireless terminal comprising:
   a receiver configured to receive a grant for uplink transmission from the network node, wherein the received grant indicates a first number of repetitions;
   a transmitter configured to transmit on an uplink shared channel according to the first number of repetitions; and
   a processing circuit configured to monitor a first channel for a message a first number of subframes after the transmitter transmits on the uplink shared channel according to the first number of repetitions, wherein the first channel comprises a physical downlink control channel for machine-type communications (MTC);
   if the processing circuit detects and correctly decodes the message, and if the decoded message requests retransmission, the processing circuit is further configured to perform adaptive uplink retransmission, via the transmitter, according to a first retransmission format indicated by the decoded message.

8. The wireless terminal of claim 7 wherein the processing circuit is further configured to perform non-adaptive retransmission, via the transmitter, according to a second retransmission format if at least one of the message is not detected, the message is not correctly decoded, and the message does not request retransmission, wherein the second retransmission format comprises a currently controlling retransmission format previously received from the network node.

9. The wireless terminal of claim 7 wherein the adaptive uplink retransmission comprises asynchronous uplink retransmission, and wherein the message includes downlink control information indicating a process number for the adaptive uplink retransmission.

10. The wireless terminal of claim 9 wherein the process number comprises a hybrid automatic repeat request (HARQ) process number.

11. The wireless terminal of claim 7 wherein the first retransmission format defines at least one of a modulation and coding rate for the adaptive uplink retransmission, a frequency resource for the adaptive uplink retransmission, and a second number of repetitions for the adaptive uplink retransmission.

12. The wireless terminal of claim 7 wherein the grant for uplink transmission comprises a downlink control information (DCI) indicating a grant for random access channel (RACH) Msg3 transmission.

13. The wireless terminal of claim 7 wherein the wireless terminal comprises a low complexity wireless terminal.

14. The wireless terminal of claim 13 wherein the low complexity wireless terminal comprises an MTC wireless terminal.

15. A computer program product stored in a non-transitory computer readable medium for controlling a wireless terminal in communication with a wireless network node, the computer program product comprising software instructions that when run on the wireless terminal, causes the wireless terminal to:
receive a grant for uplink transmission from the network node, wherein the received grant indicates a first number of repetitions;
transmit on an uplink shared channel according to the first number of repetitions;
monitor a first channel for a message a first number of subframes after the wireless terminal transmits on the uplink shared channel according to the first number of repetitions, wherein the first channel comprises a physical downlink control channel for machine-type communications; and
if the message is detected and correctly decoded, and if the decoded message requests retransmission, perform adaptive uplink retransmission according to a first retransmission format indicated by the decoded message.

16. A method performed by a wireless network node in communication with a wireless terminal, the method comprising:
transmitting a grant for uplink transmission to the wireless terminal, wherein the transmitted grant indicates a first number of uplink repetitions; and
transmitting a message to the wireless terminal via a first channel comprising a physical downlink control channel for machine-type communications to provide an adaptive retransmission format to the wireless terminal a first number of subframes after the wireless terminal transmits on an uplink shared channel according to the first number of uplink repetitions, the adaptive retransmission format being for a subsequent uplink retransmission from the wireless terminal.

17. The method of claim 16 wherein the adaptive retransmission format defines at least one of a modulation and coding rate for the adaptive uplink retransmission, a frequency resource for the adaptive uplink retransmission, and a second number of repetitions for the adaptive uplink retransmission.

18. The method of claim 16 wherein transmitting the grant for uplink transmission comprises transmitting a downlink control information (DCI) indicating a grant for random access channel (RACH) Msg3 transmission.

19. The method of claim 16 wherein the adaptive uplink retransmission comprises asynchronous uplink retransmission, and wherein the message includes downlink control information indicating a process number for the subsequent uplink retransmissions from the wireless terminal.

20. The method of claim 19 wherein the process number comprises a hybrid automatic repeat request (HARQ) process number.

21. A wireless network node in communication with a wireless terminal, the wireless network node comprising:
a receiver;
a transmitter configured to transmit a grant for uplink transmission to the wireless terminal, wherein the transmitted grant indicates a first number of repetitions; and
a processing circuit configured to generate a message for a first channel comprising a physical downlink control channel for machine-type communications, wherein the message provides an adaptive retransmission format to the wireless terminal a first number of subframes after the wireless terminal transmits on an uplink shared channel according to the first number of repetitions, the adaptive retransmission format being for a subsequent uplink retransmission from the wireless terminal;
wherein the transmitter is further configured to transmit the message via the first channel.

22. The wireless network node of claim 21 wherein the adaptive retransmission format defines at least one of a modulation and coding rate for the adaptive uplink retransmission, a frequency resource for the adaptive uplink retransmission, and a second number of repetitions for the adaptive uplink retransmission.

23. The wireless network node of claim 21 wherein the grant for uplink transmission comprises a downlink control information (DCI) indicating a grant for random access channel (RACH) Msg3 transmission.

24. The wireless network node of claim 21 wherein the adaptive uplink retransmission comprises asynchronous uplink retransmission, and wherein the transmitted message includes downlink control information indicating a process number for the subsequent uplink retransmissions.

25. The wireless network node of claim 24 wherein the process number comprises a hybrid automatic repeat request (HARQ) process number.

26. A computer program product stored in a non-transitory computer readable medium for controlling a wireless network node in communication with a wireless terminal, the computer program product comprising software instructions that when run on the wireless network node, causes the wireless network node to:
transmit a grant for uplink transmission to the wireless terminal, wherein the transmitted grant indicates a first number of uplink repetitions; and
transmit a message to the wireless terminal via a first channel comprising a physical downlink control channel for machine-type communications to provide an adaptive retransmission format to the wireless terminal a first number of subframes after the wireless terminal transmits on an uplink shared channel according to the first number of uplink repetitions, the adaptive retransmission format being for a subsequent uplink retransmission from the wireless terminal.

* * * * *